US009846983B2

(12) United States Patent
Kessler et al.

(10) Patent No.: US 9,846,983 B2
(45) Date of Patent: Dec. 19, 2017

(54) DEVICE FOR VERIFYING DOCUMENTS

(71) Applicant: BUNDESDRUCKEREI GMBH, Berlin (DE)

(72) Inventors: Horst Kessler, Berlin (DE); Andreas Wolf, Jena (DE); Uwe Rabeler, Hannover (DE); Martin Baumscheiper, Neustadt a. Rbge. (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 0 days.

(21) Appl. No.: 15/021,976

(22) PCT Filed: Sep. 16, 2014

(86) PCT No.: PCT/EP2014/069652
§ 371 (c)(1),
(2) Date: Mar. 15, 2016

(87) PCT Pub. No.: WO2015/036602
PCT Pub. Date: Mar. 19, 2015

(65) Prior Publication Data

US 2016/0225214 A1 Aug. 4, 2016

(30) Foreign Application Priority Data

Sep. 16, 2013 (DE) ........................ 10 2013 110 165

(51) Int. Cl.

| | |
|---|---|
| ***G06K 9/74*** | (2006.01) |
| ***B07C 5/00*** | (2006.01) |
| ***B07C 1/00*** | (2006.01) |
| ***G07D 7/121*** | (2016.01) |
| ***G07D 7/12*** | (2016.01) |

(52) U.S. Cl.
CPC ............... *G07D 7/121* (2013.01); *G07D 7/12* (2013.01)

(58) Field of Classification Search
CPC .......... G01N 21/956; G07D 7/20; G07D 7/12; G07D 7/121
USPC .................... 356/71; 250/208.4, 214 R, 556; 209/534, 655, 562
See application file for complete search history.

(56) References Cited

U.S. PATENT DOCUMENTS 5,742,709 A 4/1998 Ueno et al.
5,890,305 A * 4/1999 Inbar .................... G02B 27/024 40/361

(Continued)

FOREIGN PATENT DOCUMENTS

DE 19842313 A1 3/2000
EP 0925679 A1 6/1999

(Continued)

OTHER PUBLICATIONS

International Search Report dated Nov. 12, 2014, PCT Patent Application No, PCT/EP2014/069652 dated Sep. 16, 2014 (ISA/EPO).

*Primary Examiner* — Sunghee Y Gray
(74) *Attorney, Agent, or Firm* — Mannava & Kang, P.C.; Arash Behravesh

(57) ABSTRACT

The invention relates to a device for verifying documents (100) having a light-transparent document support (101) for the receiving a document and a light non-transparent covering (103) for covering the light-transparent document support (101), the light non-transparent covering (103) comprises a lighting device (105) for screening the document.

18 Claims, 4 Drawing Sheets

(56) References Cited

U.S. PATENT DOCUMENTS

| | | | | |
|---|---|---|---|---|
| 6,366,367 | B1 * | 4/2002 | Schreier | H04N 1/0402 358/474 |
| 6,614,563 | B1 | 9/2003 | Batten et al. | |
| 6,678,075 | B1 * | 1/2004 | Tsai | G03G 15/60 358/474 |
| 2003/0112459 | A1 * | 6/2003 | Yamada | G07D 7/20 358/1.14 |
| 2006/0119876 | A1 | 6/2006 | Kenner | |
| 2013/0229690 | A1 * | 9/2013 | Sumita | H04N 1/00127 358/1.15 |

FOREIGN PATENT DOCUMENTS

| | | | |
|---|---|---|---|
| EP | 1324283 | A1 | 7/2003 |
| EP | 1826729 | A1 | 8/2007 |
| FR | 2859806 | A1 | 3/2005 |

* cited by examiner

DEVICE FOR VERIFYING DOCUMENTS

PRIORITY

The present application claims priority under 35 U.S.C. §371 to PCT Application PCT/EP2014/069652 filed on Sep. 16, 2014, which claims priority to German Patent Application No. 10 2013 110 165.8, filed on Sep. 16, 2013, the disclosures of which are hereby incorporated by reference in their entireties.

TECHNICAL FIELD

The present invention relates to the field of verifying documents for genuineness.

BACKGROUND

Various applications customarily make use of full-page document verification devices equipped with optical imaging cameras, including for instance border control in the performing of first-line inspections, for the purpose of verifying the genuineness of documents such as for example passports or identity cards.

An imaging camera of such a document reader is usually housed in a camera compartment which is covered by a translucent document bed, usually of transparent glass. The document to be captured is placed on the document bed and illuminated with light from the camera compartment in different wavelength ranges, for instance white light, UVA or near-IR. The reflected light is optically captured by means of the imaging camera as a reflected-light image and subsequently evaluated.

Yet conventional document verification devices cannot verify all the security features used in documents. For this reason, qualified personnel customarily perform secondary forensic verifications of documents in test labs. The process can visually verify e.g. watermarks. Yet secondary verifying of a document's genuineness is expensive and time-consuming and requires qualified personnel.

SUMMARY OF THE INVENTION

It is thus the task of the present invention to provide an efficient document verification device which enables secondary verification of documents, also for first-line inspections as applicable.

This task is solved by the features of the independent claims. Advantageous further developments form the subject matter of the description, the figures and the dependent claims.

The invention is based on the recognition that the above task can be efficiently solved by providing an additional lighting unit in a cover of a document verification device's document bed. In so doing, existing document verification devices can also be enhanced by a light transmission function, enabling a document reader to automatically inspect the internal structures of documents, e.g. watermarks or security threads. The additional lighting unit can also be retrofitted in many cases so that existing document verification devices can also be cost-efficiently enhanced by an additional verification functionality.

According to one aspect, the invention relates to a document verification device having a translucent document bed for receiving a document and a non-translucent cover for covering the translucent document bed, wherein the non-translucent cover comprises a lighting device for transmitting light through the document.

The term translucent as used herein is to be understood as at least partial and/or intermittent transparency to light.

The term non-translucent as used herein is to be understood as a lesser transparency to light as that of the translucent document bed. The non-translucent cover can be at least partially and/or intermittently non-transparent to light.

Transmitting light through the document during document verification enables the verifying of a document's internal security features, e.g. watermarks, metallic structures such as metal threads or other embedded structures which can readily be made visible by means of conventional imaging based on reflected or remitted light.

The translucent document bed can for example be made of glass. The document bed can be arranged for example on an upper surface of the document verification device.

The document bed can however also be arranged on the side of the document verification device. In this case, the non-translucent cover is likewise arranged on the side of the document verification device and designed to press the document against the document bed, e.g. by spring action. Doing so allows adjusting for different document thicknesses and/or sizes, e.g. ID-1, ID-2, or passports having varying numbers of visa pages.

Upon a document being placed at or on the translucent document bed, its reverse side faces away from the translucent document bed and faces the non-translucent cover. The lighting device illuminates the reverse side of the document, whereby light is transmitted through the document towards the translucent document bed. The light-through-image thereby resulting can for example be optically captured by an imaging camera which can be arranged in a camera compartment behind the translucent document bed and evaluated by a processor.

The document can be one of the following documents: a monetary document, particularly a banknote, an identity document such as an identity card, passport, access control badge, access permit, company badge, control token or ticket, birth certificate, driver's license or vehicle registration, or a payment instrument, e.g. debit or credit card. The document can be single or multi-layer and paper and/or plastic-based respectively.

The document can be comprised of plastic-based films bonded together into a single body by adhesive and/or lamination, whereby the films preferably have similar material properties.

According to one embodiment, the lighting device is designed to emit white light, ultraviolet light and/or infrared light.

According to one embodiment, the lighting device is arranged on or in a side of the cover of the non-translucent cover faceable towards the translucent document bed. This enables the light to be emitted in the direction of the translucent document bed. The non-translucent cover simultaneously prevents the incidence of stray light on the translucent document bed.

According to one embodiment, the lighting device is configured to produce illumination regions of different size in order to be able to transmitting light through variously sized documents. To this end, the lighting device can comprise a plurality of light elements, e.g. LEDs, which are arranged in planar fashion and form individually controllable or activatable luminous areas.

According to one embodiment, the lighting device comprises a plurality of switchable light elements, light-emitting diodes in particular, in order to produce illumination regions of different size for transmitting light through differently sized documents. The illumination regions are determined by the size of a lighting device's luminous area. The size of an illumination region can be determined for example by the number of planar light elements which are activated; i.e. switched on.

According to one embodiment, the lighting device comprises first light elements which define a first illumination region and second light elements which define a second illumination region, wherein the first light elements can be activated for transmitting light through a document of a first size, and wherein the first light elements and the second light elements can be activated for transmitting light through a document of a second size, or wherein the second light elements can be deactivated for transmitting light through a document of a first size.

The second light elements can be activated additionally to the first light elements, thereby enabling the size of the document to be selected, for example by means of a user interface, e.g. a graphical user interface or a switch. The size of the document can however also be detected automatically. To this end, an imaging camera of the document verification device can take a calibration image of the document. An outline and thus a size of the identification item can be determined based on the calibration image, for example by means of edge detection.

According to one embodiment, the second illumination region at least partly surrounds the first illumination region or the second illumination region adjoins the first illumination region. In so doing, differently sized illumination regions can be produced to transmit light through differently sized documents.

According to one embodiment, the lighting comprises a plurality of light elements which operate, for example turn on or off, as a function of the size and/or position of the presented document. For example, a reflected-light image is thereby first taken, by means of which the size and position of the document is determined. Depending on the determination, the appropriate light elements for transmission light, which are located behind the document, can then be activated. Doing so enables the illumination region to be produced in different placement positions for transmitting light through differently sized documents.

According to one embodiment, the translucent document bed has sectionally variable light transparency. This is achieved by the document bed being able to be sectionally blackened in order to prevent incident extraneous light on the document bed from reaching a camera compartment with an imaging camera located underneath or behind the document bed as the case may be. The document bed area which can be covered by the document is however not blackened or is switched to translucent respectively, so as to enable the imaging camera to optically capture the document.

According to one embodiment, a first document bed area of the translucent document bed can be covered by the document, whereby a second document bed area of the translucent document bed is arranged outside of the first document bed area, and whereby a translucency of the first document bed area can be set or selected to be higher than a translucency of the second document bed area. This translucency setting can be made by a processor, for example the processor described herein. Reducing the translucency of the second document bed area blackens the same. On the other hand, the first, translucent document bed area is covered by the document. Thus, no extraneous light can infiltrate through, underneath or behind the document bed into a camera compartment covered by said document bed.

According to one embodiment, the translucent document bed has liquid crystal cells, areas of which can be controlled to sectionally vary the translucency of the translucent document bed, or whereby the translucent document bed comprises a liquid crystal layer, particularly a film, wherein the liquid crystal layer comprises liquid crystal cells, areas of which can be controlled to sectionally vary the translucency of the translucent document bed, e.g. supplied an electrical voltage. Activation can be effected by a processor, for example the processor described herein.

In both cases, the liquid crystal cells can be arranged in a matrix and areas of same assigned to the first document bed area or to the second document bed area, for example by addressing.

At the beginning of the optical capture, the entire document bed is for example translucent, thereby enabling the optical detecting of the first document bed area. This can for example ensue by means of detecting the outline of the document on the document bed, e.g. with the processor described herein. The second document bed area not covered by the document is then switched to non-translucent or blackened respectively, e.g. with the processor described herein. After this blackening, the document can be optically captured, for example by an optical camera disposed underneath the document bed.

According to one embodiment, the processor is configured to determine the first document bed area based on the optical capture of the document. By so doing, the geometric dimensions or position respectively of the first document bed area can be determined as a function of a size and/or positioned location of the document positionable on the document bed. Starting from an initially translucent document bed, the optical capture of the document can be produced for example by an optical camera of the document reader which is evaluated by the processor in order to detect the document or its position respectively on the document bed therefrom. This detection can be realized by means of edge detection or pattern recognition. Following the detection, the processor can blacken or switch to non-translucent the document bed area outside of the first document bed area.

This thereby achieves the adjusting of the size of the first document bed area to differently sized documents. The first document bed area can for example be switched to translucent or remain translucent while the second document bed area, which at least partially surrounds the first document bed area and is not covered by the document, is blackened or switched to non-translucent respectively. This thereby efficiently addresses scattered light incidence.

According to one embodiment, the first document bed area is predefinable as a function of the size of a document, particularly can be selected or input by means of a graphical user interface. For example, different document sizes are thereby able to be selected or input in order to define the size of the first translucent document bed area. The second document bed area, which at least partially surrounds the first document bed area or is located outside of the first document bed area respectively, is for example the remaining area of the document bed and can be e.g. blackened or switched non-translucent for optically capturing the document.

According to one embodiment, the document verification device comprises a camera compartment which is covered by the translucent document bed and an imaging camera arranged in the camera compartment for capturing a light-through-image of the document.

According to one embodiment, a further lighting device can be arranged in the camera compartment in order to illuminate the document on the translucent bed. The imaging camera can thereby optically capture the reflected-light image of the document for further document verification. The further lighting device can be designed to generate white light, infrared light or ultraviolet light.

According to one embodiment, the document verification device comprises a housing, whereby the non-translucent cover is pivotably mounted to the housing. The non-translucent cover can for example be configured as a pivotable spring flap.

According to one embodiment, the non-translucent cover comprises a first non-translucent cover element and a second non-translucent cover element, wherein the first non-translucent cover element is pivotably mounted to the housing and wherein the second non-translucent cover element is spring-mounted to the first non-translucent cover element. The non-translucent cover is thus of two-part configuration.

The second non-translucent cover element can produce a constant contact pressure on the document. The document can thereby be held against the force of gravity even in the case of a side-positioned document bed, the surface normal of which is for example perpendicular within a tolerance range to a gravitational vector. The pressure additionally achieves preventing unwanted extraneous scattered light, whereby defined transmission illumination can be realized.

According to one embodiment, the document verification device comprises a processor for controlling the lighting device or for controlling the translucency of the translucent document bed. The processor can be a processor as described above or below.

According to one embodiment, light can be transmitted through the document for the purpose of obtaining a light-through-image, and whereby the processor is configured to process the light-through-image so as to obtain a light-through-image area which corresponds to the size of a document. The light-through-image can be captured by the imaging camera. Processing can for example include so-called clipping, a software-realized cropping of the light-through-image.

According to one embodiment, light can be transmitted through the document for the purpose of obtaining a light-through-image, and whereby the processor is designed to compare the light-through-image to a reference image for the purpose of verifying the document. The light-through-image can for example be captured with the imaging camera.

According to one embodiment, the document is one of the following documents: an identification document, passport, monetary document, banknote, credit card, driver's license, company badge, waybill or access permit. Generally speaking, the document can also be any other document for which the identity and genuineness are to be verified. The document can contain an integrated circuit.

According to one aspect, the invention relates to a method for verifying a document comprising: illuminating a reverse side of a document placed faced down on a translucent document bed of a document verification device in order to transmit light through the document; and capturing a light-through-image of the document.

The document can be examined on the basis of the light-through-image, for example by comparing the light-through-image to a reference image. To this end, the document verification device can comprise a database of reference images. According to one embodiment, the document verification device comprises a communication interface for communicating with an external data server providing reference images over a communication network.

Further features of the method for verifying a document are directly yielded by the functionality of the document verification device.

According to one embodiment, the method can be realized by means of the document verification device.

According to one aspect, the invention relates to a computer program having a program code for realizing the inventive method when the program code runs on a computer.

BRIEF DESCRIPTION OF THE DRAWINGS

Reference will be made to the accompany drawings in describing further embodiments of the invention. Shown are.

DETAILED DESCRIPTION

Figure 1A:
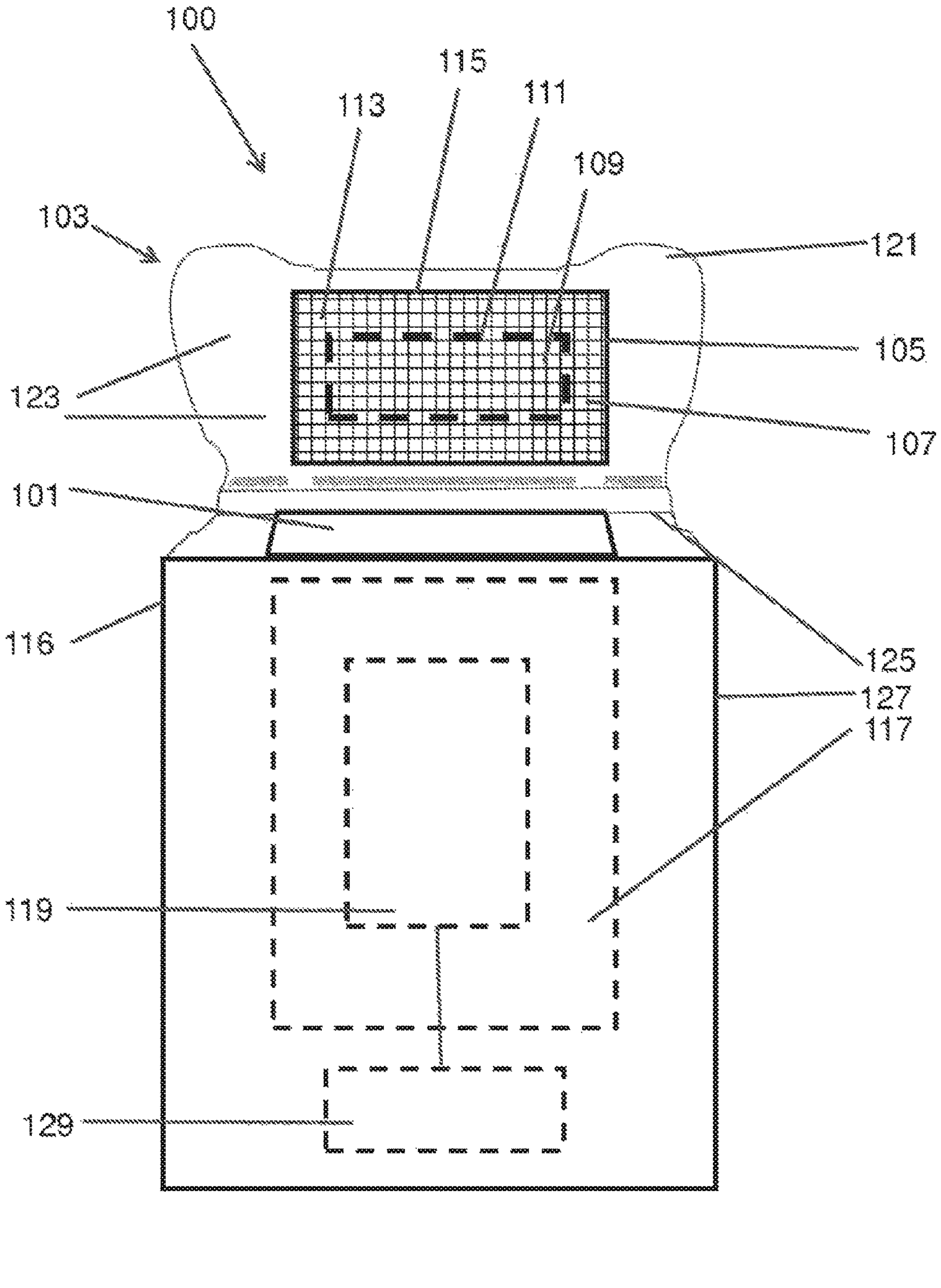
FIG. 1A, 1B a document verification device.

FIG. 1A shows a plan view of a document verification device 100 having a translucent document bed 101 for receiving a document (not shown in FIG. 1) and a non-translucent cover 103 for covering the translucent document bed 101, whereby the non-translucent cover 103 comprises a lighting device 105 for transmitting light through the document.

The lighting device 105 comprises a plurality of e.g. sectionally activatable light elements 107. The plurality of light elements 107 encompasses for example first light elements 109, which define a first illumination region 111, and second light elements 113, which define a second illumination region 115. The first light elements 109 can be activated or switched on to transmit light through a document of a first size, and the first light elements 109 and second light elements 113 can be activated or switched on together to transmit light through a larger document of a second size. Alternatively, the second light elements 113 can be deactivated when transmitting light through a document of the first size.

The document verification device 100 further comprises a housing 116 having a camera compartment 117 which is covered by the translucent document bed 101. The housing 116 further comprises an imaging camera 119 disposed within the camera compartment 117 for capturing a light-through-image of the document.

The non-translucent cover 103 is pivotably mounted to the housing 116, for example by means of one or more hinges 131.

The non-translucent cover 103 comprises a first non-translucent cover element 121 and a second non-translucent cover element 123. The first non-translucent cover element 121 is pivotably mounted to the housing 116. The second non-translucent cover element 123 is spring mounted to the first non-translucent cover element 121. The second non-translucent cover element 123 can be designed as a spring-mounted pressure clip. This allows the document to be pressed in spring-loaded fashion against the translucent document bed 101.

The translucent document bed 101 is laterally disposed on the housing 116 on a housing side 125. The housing further comprises a housing faceplate 127.

According to one embodiment, the non-translucent cover 103, which also forms a movable table, is sunken relative to the housing faceplate 127. This for example thereby enables document pages of a passport to be lain or placed on the document bed 101 when the covers are folded.

The document verification device 100 further comprises a processor 129, arranged for example in the housing 116 or in the non-translucent cover 103.

The processor 129 is designed to control the lighting device 105 so as to for example switch the light elements 107 on or off sectionally. To this end, the processor can be designed to actuate the light elements 109 of the first illumination region 111 when the document is of a first size in order to transmit light through the document. The second light elements 113 of the second illumination region 115 thereby remain switched off in order to prevent interfering extraneous light outside of the area of the document bed 101 covered by the document. Should, however, there be a larger document to be transmitted by light, the second light elements 113 of the second illumination region 115 are activated in order to produce a larger illumination region.

The processor 129 is connected to the lighting device 105, e.g. by a cable. This way, the lighting device 105 can be designed as a retrofittable component.

The document size can for example be selectable or detected automatically. A calibration image of the document outline can thereby be detected and used as a basis in determining the document size.

The processor 129 can be further designed to activate the imaging camera 119 to take the light-through-image.

A further lighting device (not shown in FIG. 1A) can moreover be provided in the camera compartment 117 in order to illuminate the document through the translucent document bed 101. The light emitted toward the imaging camera 119 from the document in response to this illumination can be detected by the imaging camera 119 and used for further document verification.

According to one embodiment, the lighting device 105 is designed to emit white light and/or infrared light and/or ultraviolet light. To this end, the light elements 107 can be designed to produce white light and/or infrared light and/or ultraviolet light. According to one embodiment, the light elements 107 comprise infrared light elements and/or white light elements and/or ultraviolet light elements which can be arranged, for example evenly distributed, in illumination regions 111 and 115.

According to one embodiment, the lighting device 105 is configured so as to illuminate by means of brief flashes or flash pulses respectively.

The processor 129 is configured to simultaneously or successively, particularly separately, switch on or activate or switch off or deactivate respectively the infrared light elements and/or white light elements and/or ultraviolet light elements for images in different spectral ranges.

According to one embodiment, the light elements 107 can be exclusively infrared light elements. In this case, the processor 129 can be designed to make use of the unused color channels for e.g. metameric red.

According to one embodiment, document mounts for different document sizes, e.g. for documents of sizes ID-1 and/or ID-2, can be used.

Figure 1B:
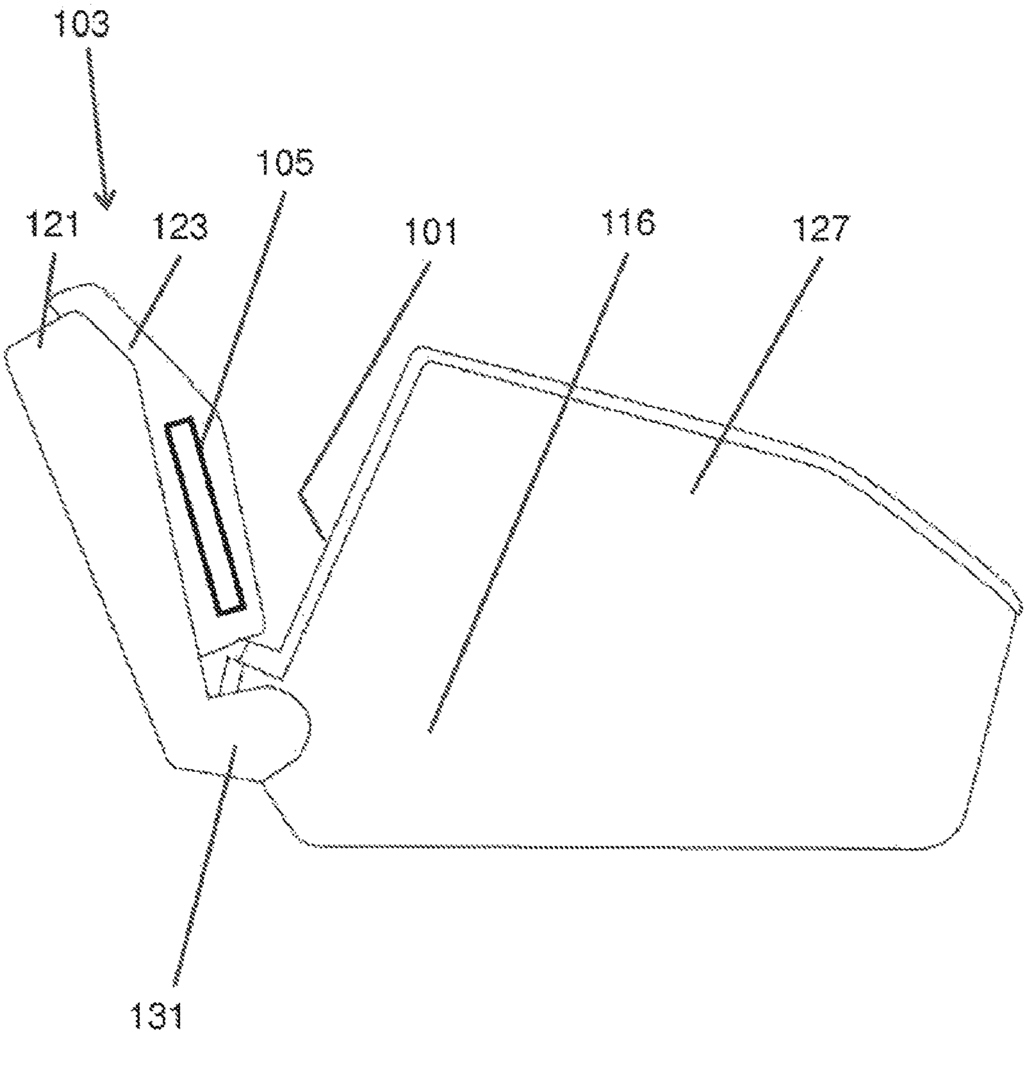

FIG. 1B shows a side view of the document reader 100 depicted in FIG. 1A. As depicted in FIG. 1B, the cover 103 is pivotably mounted to the housing 116 by laterally disposed hinges 131, particularly via the first cover element 121.

According to one embodiment, the translucent document bed 101 can have a translucency which varies in areas. In so doing, that area of the translucent document bed 101 which is not covered by a document can be blackened. This enables additional prevention against the infiltration of scattered light into the camera compartment 117.

Figure 2:
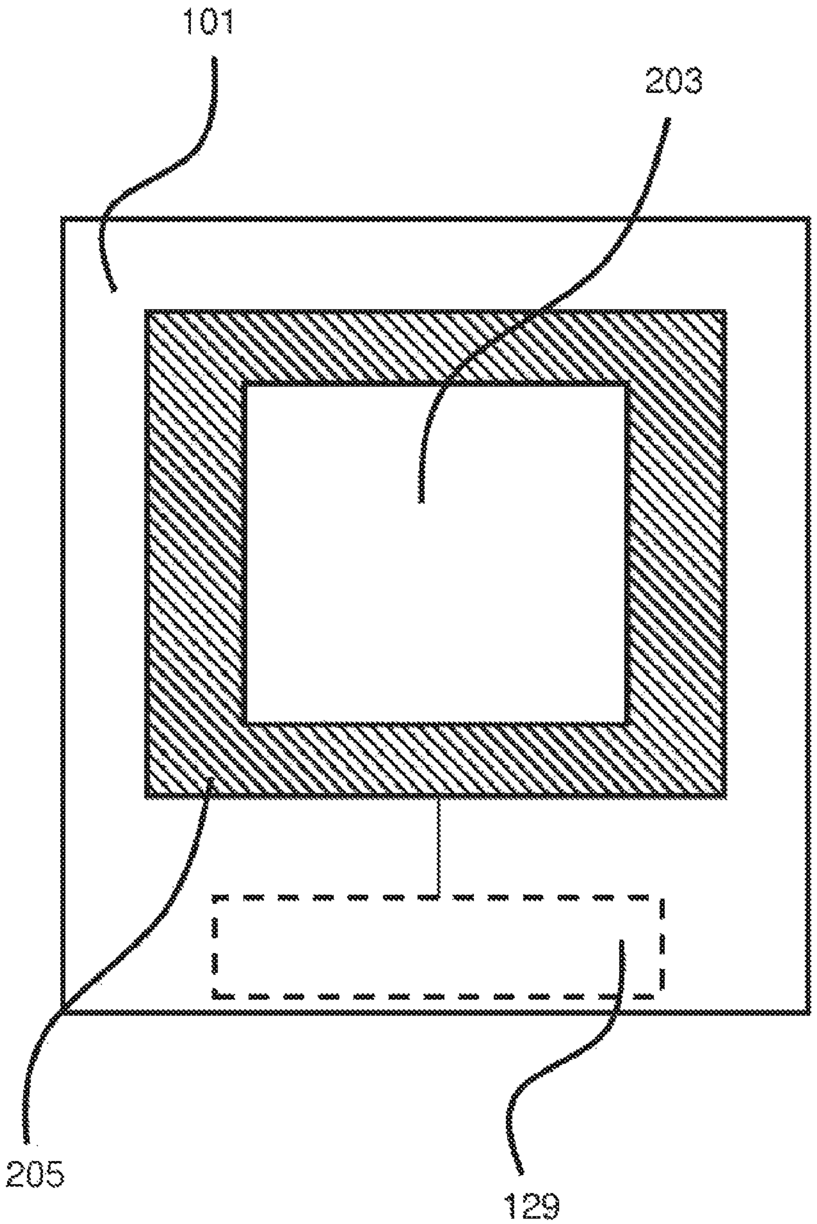
FIG. 2 a document bed.

FIG. 2 shows the document bed 101 exhibiting a sectionally variable translucency. The document bed 101 comprises a first document bed area 203 and a second document bed area 205 arranged outside of the first document bed area 203, whereby the translucency of the first document bed area 203 can be set higher than the translucency of the second document bed area 205.

To this end, the document bed 101 can comprise liquid crystal cells (LCD, liquid crystal display) (not shown in FIG. 2) which can be controlled to sectionally vary the translucency of the translucent document bed 101.

According to one embodiment, the liquid crystal cells are arranged in a layer of liquid crystals which can, for example, be a film able to cover an intrinsically transparent base glass of the document bed. According to another embodiment, the document bed is formed by a liquid crystal panel in which in liquid crystal cells are embedded. The following description relates to both of the aforementioned cases.

The liquid crystal cells are arranged for example in the form of a matrix and are for example individually or sectionally controllable by the processor 129. To this end, the processor 129 can for example supply electric voltage to an area of liquid crystal cells in order to orient the liquid crystal cells and to for example switch the first document bed area 203 to transparent or to increase the translucency of the first document bed area 203 respectively. The remaining second document bed area 205 of the document bed 101 is in contrast switched to non-translucent by the liquid crystal cells associated with the second document bed area 205 not being supplied with voltage or further voltage.

Activation of the liquid crystal cells can ensue by means of the processor 129. To this end, the processor 129 is for example designed to differently control different document bed areas of the document bed 101, for example as a function of the size of a document placed onto the document bed, so as to blacken, or switch to non-translucent respectively, those areas of the document bed not covered by a document.

During the operation of the document reader 100, the processor 129 is designed to for example switch to transparent or leave transparent a first document bed area 103, which is covered by a document, and switch to non-translucent or leave non-translucent a second document bed area 103, which is arranged outside of the first document bed area 103, in order to prevent extraneous light from infiltrating through the document bed 101.

The processor 129 can further control the imaging camera 119 in order to for example produce a calibration image of a document starting from an initially translucent document bed 101. The processor 129 can be designed to determine a position and size of the document on the basis of the calibration image in order to determine the first document bed area 203. The control unit can hereby perform for example edge detection or pattern recognition.

According to one embodiment, optically detecting the first document bed area 203 covered by the document can be omitted when the document size is for example selectable by means of user prompting or a graphical user interface and/or when the document bed is provided with positioning markings for different documents.

The second document bed area 205 lying outside of the first document bed area 203 can thereafter be blackened and/or switched to non-translucent in order to prevent the infiltration of extraneous light into the camera compartment 117. The actual optical capturing of the document which covers the first document bed area 203, and thus likewise prevents against extraneous light, can then be carried out by the imaging camera 119. Optical capture can likewise be triggered by the processor 129.

According to one embodiment, the processor 129 forms a controller for the document reader and assumes all control tasks.

Figure 3:
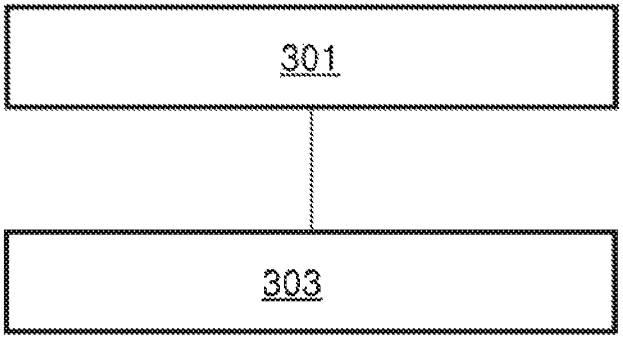
FIG. 3 a flowchart of a method for optically capturing a document.

FIG. 3 shows a flowchart of a method for optically capturing a document which comprises: Illuminating 301 a reverse side of a document placed face down on a translucent document bed of a document verification device in order to transmit light through the document, and taking 303 a light-through-image of the document.

The method can be realized by means of the document verification device 100.

LIST OF REFERENCE NUMERALS

100 document verification device
101 document bed
103 non-translucent cover
105 lighting device
107 plurality of light elements
109 first light elements
111 first illumination region
113 second light elements
115 second illumination region
116 housing
117 camera compartment
119 imaging camera
121 first non-translucent cover element
123 second non-translucent cover element
125 housing side
127 housing faceplate
129 processor
131 hinge
203 first document bed area
205 second document bed area

The invention claimed is:

1. A document verification device having a translucent document bed for receiving a document and a non-translucent cover for covering the translucent document bed, wherein the non-translucent cover comprises a lighting device for transmitting light through the document, and wherein the translucent document bed exhibits sectionally variable light transparency.

2. The document verification device according to claim 1, wherein the lighting device is arranged at least one of (i) on a side and (ii) in a side of the cover of the non-translucent cover faceable towards the translucent document bed.

3. The document verification device according to claim 1, wherein the lighting device is configured to produce illumination regions of different size in order to be able to transmit light through variously sized documents.

4. The document verification device according to claim 1, wherein the lighting device comprises a plurality of switchable light elements.

5. The document verification device according to claim 4, wherein at least one of the plurality of switchable light elements switches as a function of at least one of a size and a position of the document to produce illumination regions of different size for transmitting light through differently sized documents.

6. The document verification device according to claim 1, wherein the lighting device comprises first light elements which define a first illumination region and second light elements which define a second illumination region.

7. The document verification device according to claim 6, wherein the first light elements is configured to be activated for transmitting light through a document of a first size, and wherein the first light elements and the second light elements are configured to be activated for transmitting light through a document of a second size.

8. The document verification device according to claim 1, wherein a first document bed area of the translucent document bed is configured to be covered by the document, wherein a second document bed area of the translucent document bed is arranged outside of the first document bed area.

9. The document verification device according to claim 8, wherein the translucency of the first document bed area is higher than a translucency of the second document bed area.

10. The document verification device according to claim 1, wherein the translucent document bed comprises at least one of (i) liquid crystal cells, areas of which are configured to be controlled to sectionally vary the translucency of the translucent document bed and (ii) a liquid crystal layer comprising liquid crystal cells, areas of which are configured to be controlled to sectionally vary the translucency of the translucent document bed.

11. The document verification device according to claim 1, comprising a camera compartment covered by the translucent document bed and an imaging camera arranged in the camera compartment for capturing a light-through-image of the document.

12. The document verification device according to claim 1 comprises a housing and wherein the non-translucent cover is pivotably mounted to the housing.

13. The document verification device according to claim 12, wherein the non-translucent cover comprises a first non-translucent cover element and a second non-translucent cover element, wherein the first.

14. The document verification device according to claim 13, wherein the non-translucent cover element is pivotably mounted to the housing and wherein the second non-translucent cover element is spring-mounted to the first non-translucent cover element.

15. The document verification device according to claim 1 comprising a processor for controlling at least one of the lighting device and for controlling the translucency of the translucent document bed.

16. The document verification device according to claim 15, wherein light from the lighting device is configured to be transmitted through the document to obtain a light-through-image, and wherein the processor is configured to process the light-through-image to obtain a light-through-image area which corresponds to the size of a document.

17. The document verification device according to claim 15, wherein light from the lighting device is configured to be transmitted through the document to obtain a light-through-image, and wherein the processor is configured to compare the light-through-image to a reference image to verify the document.

18. A method for verifying a document, comprising:

illuminating a reverse side of a document placed faced down on a translucent document bed of a document verification device to transmit light through said document; and taking a light-through-image of the document, wherein the translucent document bed exhibits sectionally variable light transparency.

* * * * *